Dec. 17, 1946.   D. A. DUGGER   2,412,569
TAPER GAUGE
Filed Aug. 7, 1944

Inventor
Dale A. Dugger
Attorneys

Patented Dec. 17, 1946

2,412,569

UNITED STATES PATENT OFFICE 2,412,569

TAPER GAUGE

Dale A. Dugger, Chicago, Ill.

Application August 7, 1944, Serial No. 548,451

4 Claims. (Cl. 33—75)

This invention appertains to new and useful improvements in gauges for gauging tapered bodies. Calipers and various other instruments have been heretofore employed for the purpose of measuring tapers, but such devices have been found cumbersome and not always accurate due to the fact that a great deal is left to individual estimate and judgment.

The principal object of the present invention is to provide a taper gauge which can be set for the positive measuring with precision of a definite size taper.

Another important object of the invention is to provide a taper gauge in which a tapered body can be precisely gauged and which in operation will indicate the size of the taper being measured if it does not match the zero reading of the gauge, which gauge has been set for a predetermined size taper.

Still another important object of the invention is to provide a taper gauge in which the parts can be readily adjusted to take care of the various refinements necessary in gauging tapers with precision.

Other objects and advantages of the invention shall become apparent to the reader of the following description.

Figure 1:
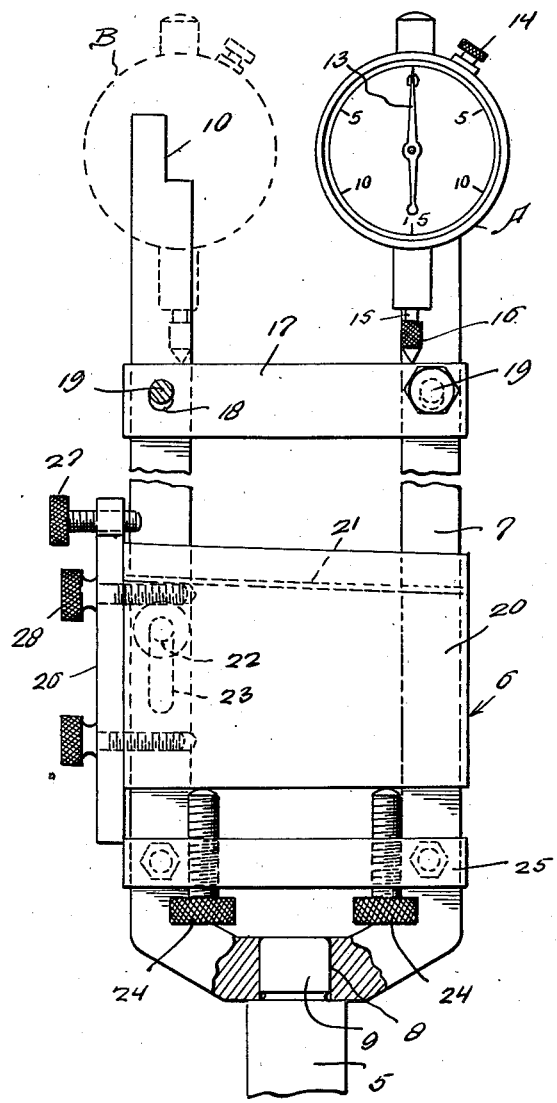
Figure 1 is a front elevation of the gauge with certain parts in section.
Figure 2:
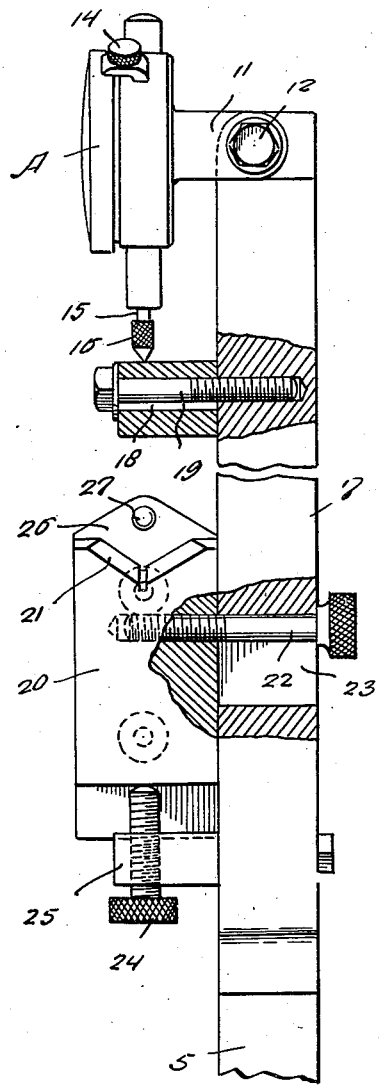
Figure 2 is a side elevational view of the gauge with several portions in section.

Referring to the drawing wherein like numerals designate like parts, it can be seen that numeral 5 denotes a post upon which the improved gauge generally referred to by numeral 6 is swivelly mounted. The gauge includes a U-shaped frame 7, the lower portion of which has an opening 8 therethrough for receiving a reduced extension 9 of the post 5 around which the frame 7 is intended to rotate, that is, when it is desired to bring the front of the gauge into a position most convenient to the tester.

The upper portion of the U-shaped frame 7 has the ends of its leg portions cut away, as at 10, to accommodate the rear end portions of shanks 11 which project rearwardly from gauges A, B. Suitable means 12 is employed for securing the indicating instruments in place.

The indicating instruments are of conventional design, each including an indicating hand 13 and a set knob 14. The hand 13 is operated by a plunger 15, the same having a head 16 adapted to engage work.

In carrying out the present invention, the heads 16 of the indicating instrument plungers 15 engage a floating bar 17, this bar having oversize openings 18 therethrough, through which headed screws 19 are disposed, these screws being driven into corresponding legs of the frame 7.

A block 20 having an inclined V-shaped trough 21 in the top side thereof is slidable against the front sides of the legs of the frame 7. This block 20 is formed with a threaded bore to receive a screw 22 which is disposed through a vertical slot 23 in one leg of the frame 7. Obviously, by loosening the screw 22, the block 20 is free to be moved upwardly and downwardly on the frame by actuation of a pair of adjusting screws 24 which are threadedly disposed through a shelf 25 secured to the frame 7 below the block 20.

Secured to the large end of the block 20 is a vertically disposed plate 26, the upper end of which projects above the level of the top of the block 20 where it is provided with an abutment screw 27. Screws 28, 29 are disposed through the plate 26 and into the large end of the block 20 to secure the plate definitely in position.

Obviously the screw 27 can be adjusted to the desired position to fix the extension to which a tapered body can be inserted into the gauge.

In setting the gauge for future use in testing tapered bodies of a predetermined size, a standard or master taper is placed upon the block 20 and the abutment screw 27 properly adjusted to get the right longitudinal positioning thereof. Subsequently, the screws 24 are adjusted to obtain a reading on the indicating instrument A, and also on the instrument B if two instruments are being employed. The gauge is then definitely set by tightening the screw 22 and actuating the set knob 14 on the indicating instrument to place the indicating arm 13 at zero.

It can now be seen, that in adjusting the size of tapers after this permanent setting of the gauge, if the taper being gauged is of the predetermined size, it will indicate zero on the indicating instrument A. However, if it is of a different size, then that size will be indicated on the indicating instrument by deflection of the indicating arm.

The advantage of such a gauge is that it is capable of being readily set up. It is adaptable to substantially every standard shank taper used on drill reamers. The indicating instrument or instruments are intended to indicate exactly the amount of stock to be removed and any variation in a taper.

While the foregoing specification sets forth the invention in specific terms, it is to be understood that numerous changes in the shape, size and materials may be resorted to without departing from the spirit and scope of the invention as claimed hereinafter.

Having described the invention, what is claimed as new is:

1. A taper gauge comprising a frame, a taper horizontal supporting block, a pin and slot connection between one end of the block and the frame for vertical adjustment of the block bodily and for vertical swinging adjustment of the free end of the block, a floating body on the frame between which and the block a taper is insertable, and an indicating instrument carried by the frame and including an operating member against which the floating body is operative.

2. A taper gauge comprising a frame, a taper horizontal supporting block, a pin and slot connection between one end of the block and the frame for vertical adjustment of the block bodily and for vertical swinging adjustment of the free end of the block, a floating body on the frame between which and the block a taper is insertable, an indicating instrument carried by the frame and including an operating member against which the floating body is operative, and an adjustable abutment at one end of the upper portion of the block.

3. A taper gauge comprising a frame, a taper horizontal supporting block, a pin and slot connection between one end of the block and the frame for vertical adjustment of the block bodily and for vertical swinging adjustment of the free end of the block, a floating body on the frame between which and the block a taper is insertable, an indicating instrument carried by the frame and including an operating member against which the floating body is operative, the block being formed with a V-shaped trough in the taper-receiving side portion thereof.

4. A taper gauge comprising a frame, a taper horizontal supporting block, a pin and slot connection between one end of the block and the frame for vertical adjustment of the block bodily and for vertical swinging adjustment of the free end of the block, a floating body on the frame between which and the block a taper is insertable, an indicating instrument carried by the frame and including an operating member against which the floating body is operative, and set screws for adjusting the position of each end of the block on the frame.

DALE A. DUGGER.